United States Patent
Jung et al.

(10) Patent No.: US 8,675,230 B2
(45) Date of Patent: Mar. 18, 2014

(54) RECOGNIZING AN IMAGE FORMING APPARATUS AS A PRINTER AND AN EXTERNAL STORAGE DEVICE TO REDUCE AN INITIALIZATION TIME OF THE IMAGE FORMING APPARATUS

(75) Inventors: Jung-woon Jung, Suwon-si (KR); Jung-soo Seo, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 210 days.

(21) Appl. No.: 13/225,923

(22) Filed: Sep. 6, 2011

(65) Prior Publication Data

US 2012/0057185 A1 Mar. 8, 2012

(30) Foreign Application Priority Data

Sep. 7, 2010 (KR) .................. 10-2010-0087594

(51) Int. Cl.
*G06F 3/12* (2006.01)

(52) U.S. Cl.
USPC ........................ 358/1.15; 358/1.14

(58) Field of Classification Search
USPC ............................... 358/1.15, 1.14
See application file for complete search history.

(56) References Cited

U.S. PATENT DOCUMENTS

| | | | |
|---|---|---|---|
| 2003/0046447 A1 | 3/2003 | Kouperchliak et al. | |
| 2008/0055640 A1* | 3/2008 | Takahashi et al. | 358/1.15 |
| 2008/0276012 A1 | 11/2008 | Mesa et al. | |
| 2009/0097056 A1* | 4/2009 | Kim et al. | 358/1.15 |
| 2010/0042987 A1 | 2/2010 | Yamada | |
| 2012/0054372 A1* | 3/2012 | Chen et al. | 710/13 |

FOREIGN PATENT DOCUMENTS

WO 2005010751 2/2005

OTHER PUBLICATIONS

European Search Report dated May 28, 2013 issued in EP Application No. 11164987.7.

* cited by examiner

*Primary Examiner* — Eric A Rust
(74) *Attorney, Agent, or Firm* — Stanzione & Kim, LLP (57) ABSTRACT

An image forming apparatus includes a communication interface unit which allows the print controlling terminal to recognize the image forming apparatus as a printer, a determination unit which determines whether a printer driver of the image forming apparatus is installed in the print controlling terminal, a controlling unit which controls the communication interface unit to receive print data generated by the printer driver, and an image forming unit which prints the received print data, and the communication interface unit, if a printer driver is not installed in the print controlling terminal, controls the print controlling terminal to additionally recognize the image forming apparatus as an external storage medium and provides the print controlling terminal with a printer driver installation program stored in the external storage medium, and a method of performing the same.

19 Claims, 7 Drawing Sheets

| HARD DISK DRIVE | |
|---|---|
| ◇ LOCAL DISK(C:) | LOCAL DISK |
| ◇ LOCAL DISK(D:) | LOCAL DISK |
| APPARATUS INCLUDING REMOVABLE STORAGE | |
| ◈ DVD-RAM DRIVE(E:) | CD DRIVE |
| ◈ DVD DRIVE(F:) | CD DRIVE |
| OTHERS | |
| ▯ CONTROL PANEL | SYSTEM FOLDER |
| ◈ PRINTER AND FAX | SYSTEM FOLDER |
| ▣ BLUETOOTH ENVIRONMENT | SYSTEM FOLDER |

FIG. 7

RECOGNIZING AN IMAGE FORMING APPARATUS AS A PRINTER AND AN EXTERNAL STORAGE DEVICE TO REDUCE AN INITIALIZATION TIME OF THE IMAGE FORMING APPARATUS

CROSS-REFERENCE TO RELATED APPLICATIONS

This application claims priority from Korean Patent Application No. 2010-0087594, filed in the Korean Intellectual Property Office on Sep. 7, 2010, the disclosure of which is incorporated herein by reference in its entirety.

BACKGROUND

1. Field of the Invention

Embodiments herein relate to an image forming apparatus and a method of forming an image thereof, and more particularly, to an image forming apparatus which is recognized as a printer preferentially if the image forming apparatus is connected to a print controlling apparatus so as to reduce an initialization time of the image forming apparatus, and a method of forming an image thereby.

2. Description of the Related Art

Generally, an image forming apparatus represents an apparatus which prints print data generated by a print controlling terminal such as a computer on a recording medium such as a printing paper. Examples of an image forming apparatus include a copy machine, printer, a fax machine, and a Multi-Function Peripheral (MFP) which performs the above functions in a single device.

Recently, an information technology (IT) apparatus performs a function which allows a corresponding driver to be installed in a host apparatus only by storing and connecting a driver program inside the host apparatus without a separate compact disk (CD). Specifically, the IT apparatus allows itself to be recognized as a CD-ROM device so that a program stored in the CD-ROM device may be installed automatically through the auto-run function of a window operating system, and this function is also provided by a recent image forming apparatus.

A conventional image forming apparatus is recognized as a CD-ROM device every time the image forming apparatus is connected to a print controlling terminal to confirm that a printer driver is connected to the print controlling terminal. In addition, a program for confirming the installation of the printer driver in the print controlling terminal is executed every time the image forming apparatus is connected to the print controlling terminal. If it is determined that the printer driver is installed in the print controlling terminal, a state where the image forming apparatus is recognized as the CD-ROM device is changed to a state where the image forming apparatus is recognized as a printer.

Accordingly, it takes a considerable amount of time to initialize the image forming apparatus since the conventional image forming apparatus is first recognized as a CD-ROM device and then as a printer, regardless of whether a printer driver is installed at a time when the power is turned on/off or a USB is reconnected.

In addition, since the image forming apparatus which is recognized as a CD-ROM device in a print controlling terminal when the image forming apparatus is turned on or off becomes switched to a different status, a user may become confused. Furthermore, as a specific program is executed without a user's permission, errors in a user manipulation may occur.

SUMMARY

Embodiments of the present inventive concept relate to an image forming apparatus which is recognized as a printer preferentially if the image forming apparatus is connected to a print controlling apparatus so as to reduce an initialization time of the image forming apparatus, and a method of forming an image thereby.

Additional aspects and utilities of the present general inventive concept will be set forth in part in the description which follows and, in part, will be obvious from the description, or may be learned by practice of the present general inventive concept.

Embodiments of an image forming apparatus provide a communication interface unit which allows the print controlling terminal to recognize the image forming apparatus as a printer if the image forming apparatus is connected to the print controlling terminal, a determination unit which determines whether a printer driver of the image forming apparatus is installed in the print controlling terminal, a controlling unit which, if a printer driver is determined to be installed in the print controlling terminal, controls the communication interface unit to receive print data generated by the printer driver, and an image forming unit which prints the received print data, and the communication interface unit, if a printer driver is determined to not be installed in the print controlling terminal, may cause the print controlling terminal to additionally recognize the image forming apparatus as an external storage medium (i.e., CD-ROM) and provide the print controlling terminal with a printer driver installation program stored in the external storage medium.

The image forming apparatus may be connected to the print controlling terminal through a universal serial bus (USB).

The determination unit may determine whether a printer driver is installed in the print controlling terminal based on whether data for requesting a status of the image forming apparatus is received from the print controlling terminal.

The data for requesting a status of the image forming apparatus may be a vender request.

The printer driver installation program may be a program for installing a printer driver of the image forming apparatus in the print controlling terminal through auto-run function.

The external storage medium may be a CD-ROM device.

The communication interface unit may disconnect the external storage medium if a printer driver is installed in the print controlling terminal.

The communication interface unit may disconnect the external storage medium if data for requesting a status of the image forming apparatus is received from the print controlling terminal.

Embodiments of the present general inventive concept also provide a method of forming an image in an image forming apparatus, the method including the operations of: if the image forming apparatus is connected to the print controlling terminal, recognizing the image forming apparatus as a printer by the print controlling terminal, determining whether a printer driver of the image forming apparatus is installed in the print controlling terminal, if a printer driver is determined not to be installed in the print controlling terminal, additionally recognizing the image forming apparatus as an external storage medium (i.e., CD-ROM) by the print controlling terminal and providing the print controlling terminal with a printer driver installation program stored in the external storage medium, if a printer driver is installed in the print controlling terminal, receiving print data generated by the printer driver, and printing the received print data.

The image forming apparatus may be connected to the print controlling terminal through a universal serial bus (USB).

The determining may include determining whether a printer driver is installed in the print controlling terminal based on whether data for requesting a status of the image forming apparatus is received from the print controlling terminal.

The data for requesting a status of the image forming apparatus may be a vender request.

The printer driver installation program may be a program to install a printer driver of the image forming apparatus in the print controlling terminal through auto-run function.

The external storage medium may be a CD-ROM device.

The method may further include disconnecting the external storage medium if a printer driver is installed in the print controlling terminal.

The disconnecting may include disconnecting the external storage medium if data for requesting a status of the image forming apparatus is received from the print controlling terminal.

Embodiments of the present general inventive concept also provide an image forming apparatus connectable to a print controlling terminal, including: a communication interface unit to control the print controlling terminal to recognize the image forming apparatus as a printer, and based on a determination as to whether the print controlling terminal has a printer driver installed therein, to control the print controlling terminal to additionally recognize the image forming apparatus as an external storage medium containing the printer driver; and a determination unit to determine whether the printer driver is installed in the print controlling terminal.

Embodiments of the present general inventive concept also provide a method of forming an image in an image forming apparatus connectable to a print controlling terminal, the method including: controlling the print controlling terminal to recognize the image forming apparatus as a printer when the image forming apparatus is connected to the print controlling terminal; determining whether the print controlling terminal has a printer driver installed therein; and controlling the print controlling terminal to further recognize the image forming apparatus as an external storage medium containing the printer driver when it is determined that the print controlling terminal does not have a printer driver installed therein and installing the printer driver to the print controlling terminal.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE EMBODIMENTS

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
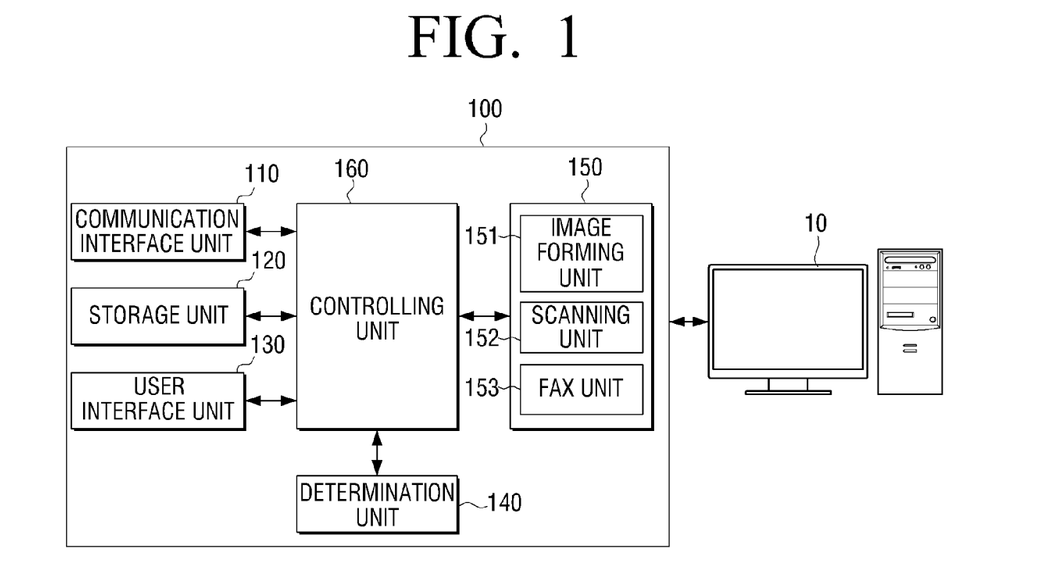
FIG. 1 is a block diagram illustrating the configuration of an image forming apparatus according to an exemplary embodiment.

FIG. 1 is a block diagram illustrating a configuration of an image forming apparatus according to an exemplary embodiment.

Referring to FIG. 1, the image forming apparatus 100 comprises a communication interface unit 110, a storage unit 120, a user interface unit 130, a determination unit 140, a function unit 150, and a controlling unit 160.

The communication interface unit 110 is formed to connect the image forming apparatus 100 to a print controlling terminal 10, and may be connected through a universal serial bus (USB) port.

When the image forming apparatus 100 is turned on, the communication interface unit 110 initializes the USB port and may determine whether the print controlling terminal 10 is connected to the USB port. If it is determined that the print controlling terminal 10 is connected to the USB port, the communication interface unit 110 controls the print controlling terminal 10 to recognize the image forming apparatus 100 as a printer so that the image forming apparatus 100 may be connected to the print controlling terminal 10 as a printer. Meanwhile, detailed operations of the print controlling terminal 10 which recognize the image forming apparatus 100 as a printer will be explained later with reference to FIG. 7.

The communication interface unit 110 can control the print controlling terminal 10 to additionally recognize the image forming apparatus 100 as an external storage medium. Specifically, if it is determined that a printer driver is not installed in the print controlling terminal 10 based on a determination by the determination unit 140, which will be explained later, the communication interface unit 110 can reconfigure the USB apparatus according to USB standards so that the print controlling terminal 10 may additionally recognize the image forming apparatus 100 as an external storage medium. Accordingly, the image forming apparatus 100 may be connected to the print controlling terminal 10 as a printer and an external storage medium. In this case, the external storage medium may be a CD-ROM apparatus including a printer driver and a program to install a printer driver. If the image forming apparatus 110 is connected to the print controlling terminal 10 while being recognized as an external storage medium, the image forming apparatus 110 can transmit a printer driver installing program stored in the storage unit 120, which will be explained later, to the print controlling terminal 10 so that the printer driver can be stored in the print controlling terminal 10 according to a request of the print controlling terminal 10.

Subsequently, the communication interface unit 110 may remove the connection with the external storage medium which is additionally recognized. Specifically, once a printer driver is installed in the print controlling terminal 10, the communication interface unit 110 may reconfigure the USB apparatus according to USB standards so that the external storage medium (for example, a CD-ROM) may be removed (no longer recognized) and only the printer may remain.

In addition, the communication interface unit 110 may receive data to request the status of the image forming apparatus 100 from the print controlling terminal 10. Specifically, the communication interface unit 110 may receive a vender request which is used to determine whether a printer driver is installed in the print controlling terminal 10 by the determination unit 140 which will be explained later.

Herein, the vender request is a 2-byte code through which a printer driver requests the image forming apparatus 100 to send the status of the image forming apparatus 100. Accordingly, the communication interface unit 110 may transmit an 8-byte status code including information regarding the status of the image forming apparatus 100 to the print controlling terminal 10.

The communication interface unit 110 may receive print data. In addition, the communication interface unit 110 may transmit job data generated by the function unit 150 which will be explained later (for example, a scan job data and a fax transmission job data) to the print controlling terminal 10.

The storage unit 120 stores a printer driver program and a program a) install a printer driver. Herein, the printer driver program refers to a program to compose a printer driver in the print controlling terminal 10 and the printer driver installation program refers to a program to install the printer driver in the print controlling terminal 10. In the exemplary embodiment, the printer driver program and the printer driver installation program are described separately, but this is only an example. Two programs may be combined as a single program in which the functions of the two programs are combined with each other.

The storage unit 120 also stores print data. Specifically, the storage unit 120 may store printer data received through the communication interface unit 110.

If the image forming apparatus 100 directly supports direct printing, the storage unit 120 may store files such as JIG, DOC and use those files as print data. Herein, the direct printing represents performing a printing operation only by transmitting a file to the image forming apparatus 100 without executing a separate application program in a terminal such as a PC, a notebook PC, a PDA, and a digital camera.

The user interface unit 130 comprises a plurality of function keys through which a user sets or selects various functions supported by the image forming apparatus 100, and may display various information provided by the image forming apparatus 100. The user interface unit 130 may be embodied as an apparatus which performs input and output of data simultaneously, such as a touch pad, or may be embodied as an apparatus which combines a mouse and a monitor.

The determination unit 140 determines whether a printer driver of the image forming apparatus 100 is installed in the print controlling terminal 10. Specifically, the determination unit 140 may determine whether a printer driver is installed in the print controlling terminal 10 based on whether data to request the status of the image forming apparatus 100 is received within a predetermined period of time from when the image forming apparatus 100 is connected thereto. For example, the determination unit 140 may determine that a printer driver is installed in the print controlling terminal 10 if a vender request for requesting the status of the image forming apparatus is received within 10 seconds after the print controlling terminal 10 is connected, and may determine that a printer driver is not installed if the vender request is not received after 10 seconds elapse.

In the exemplary embodiment, the predetermined period of time is set to be 10 seconds, but this only an example, and the predetermined period of time can be set to any time that satisfies the intended operations described herein. Since a printer driver usually transmits the vender request within 1 second, the predetermined period of time may be set to be 1 second.

The function unit 150 performs functions such as copying, printing, scanning, transmitting a fax, and receiving a fax in the image forming apparatus 100. Specifically, the function unit 150 may comprise an image forming unit 151, a scanning unit 152, and a fax unit 153.

The image forming unit 151 performs copying and printing. Specifically, the image forming unit 151 may print data scanned by the scanning unit 152 in the image forming apparatus or may print print data received through the communication interface unit 110.

The scanning unit 152 performs a scanning function in the image forming apparatus 100. The fax unit 153 transmits and receives a fax.

The controlling unit 160 controls each component of the image forming apparatus 100. Specifically, when the image forming apparatus 100 is turned on, the controlling unit 160 controls the communication interface unit 110 to initialize a USB port.

If the print controlling terminal 10 is connected to the image forming apparatus 100 through the USB port, the controlling unit 160 may control the communication interface unit 110 so that the print controlling terminal 10 recognizes the image forming apparatus 100 as a printer and control the determination unit 140 to determine whether a printer driver is installed in the print controlling terminal 10 based on data received from the print controlling terminal 10.

If it is determined that a printer driver is installed in the print controlling terminal 10, the controlling unit 160 performs a printing stand-by function without performing any additional operation, and if print data is received through the communication interface unit 110, the controlling unit 160 may control the image forming unit 151 to print the received print data.

On the other hand, if it is determined that a printer driver is not installed in the print controlling terminal 10, the controlling unit 160 may control the communication interface unit 110 so that the print controlling terminal 10 may additionally recognize the image forming apparatus 100 as an external storage medium to install the printer driver in the print controlling terminal 10. In this case, the print controlling terminal 10 may recognize the external storage medium (for example, a CD-ROM) as a new apparatus and install a printer driver program stored in the external storage medium by auto-running the external storage medium.

Meanwhile, in this exemplary embodiment, a printer driver is installed in the print controlling terminal 10 while a printer is connected, that is, the image forming apparatus is connected to the printer and the external storage medium. Therefore, the printer driver may be completely installed in the print controlling terminal 10 without the process of reconnecting the image forming apparatus 100.

Once a printer driver is installed in the print controlling terminal 10, the controlling unit 160 may remove the external storage medium which is connected to the print controlling terminal 10.

In an exemplary embodiment, the image forming apparatus 100 is connected to the print controlling terminal 10 through a USB, but this is only an example. The image forming apparatus 100 may also be connected to the print controlling terminal 10 by supporting PnP or through a LAN type of network. In this case, the image forming apparatus 100 may be recognized as a network printer or a network drive in the print controlling terminal.

As described above, the image forming apparatus 100 is recognized as a printer immediately after it is connected to the print controlling terminal 10 and thus, a printer initialization time may be reduced. In addition, if a printer driver is not installed in the print controlling terminal 10, the image forming apparatus 100 may control the print controlling terminal 10 to additionally recognize the image forming apparatus 100 as a CD-ROM including a printer driver so as to install the printer driver in the print controlling terminal 10. Therefore, user convenience and efficiency is enhanced.

Figure 2:
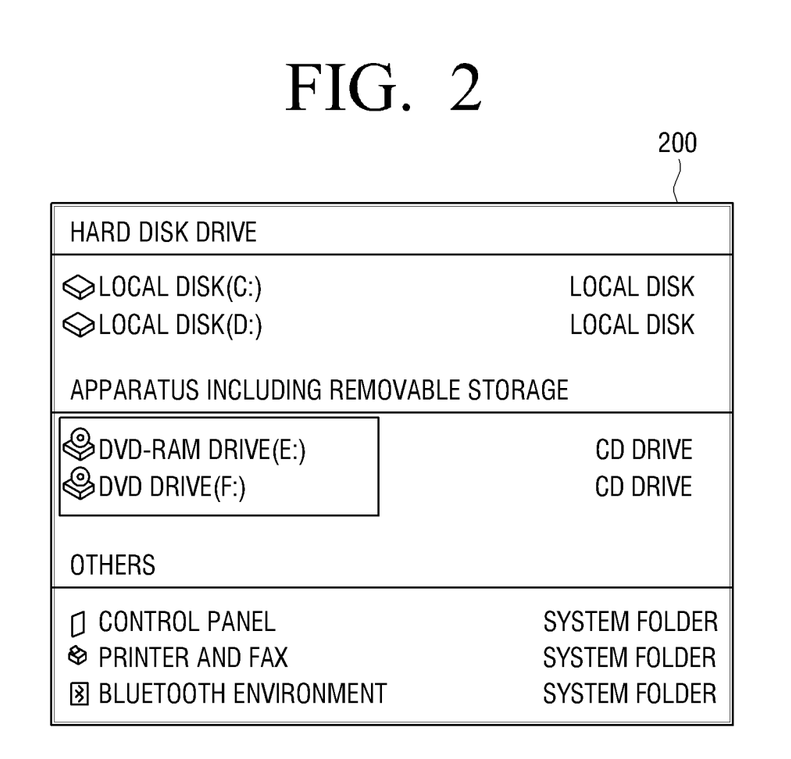
FIGS. 2 to 5 are views illustrating examples of a user interface window which can be displayed on a print controlling terminal according to an exemplary embodiment.
Figure 3:
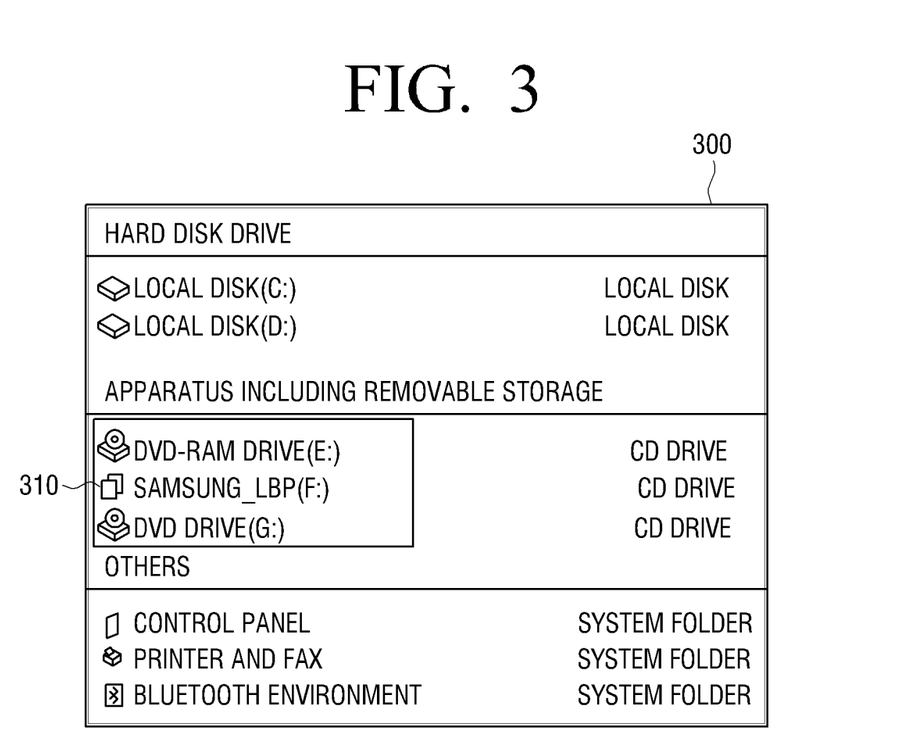

FIG. 2 is a view illustrating an example of a user interface window displayed on the print controlling terminal 10 before the print controlling terminal 10 recognizes the image forming apparatus 100 as an external storage medium. FIG. 3 is a view illustrating an example of a user interface window displayed on the print controlling terminal 10 after the print controlling terminal 10 recognizes the image forming apparatus 100 as an external storage medium.

Comparing FIG. 2 with FIG. 3, if the print controlling terminal 10 additionally recognizes the image forming apparatus 100 as an external storage medium, a CD-ROM (SAMSUNG_LBP(F:)) is additionally connected to the removable storage of the print controlling terminal 10. In the exemplary embodiment, the image forming apparatus 100 is connected to the external storage medium of the print controlling device 10 only when a printer driver is not installed in the print controlling terminal 10 so as not to cause confusion to a user.

Figure 4:
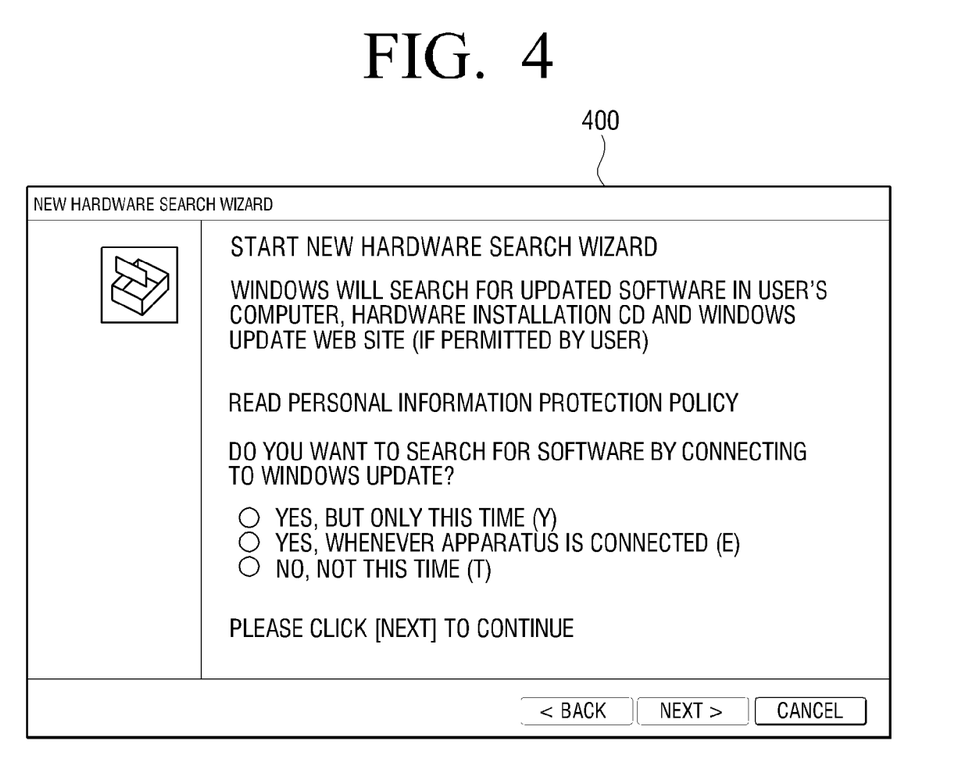

FIG. 4 is a view illustrating an example of a user interface window displayed on a print controlling terminal 10 when the print controlling terminal 10 recognizes an image forming apparatus as a printer if a printer driver is not installed in the print controlling terminal.

Referring to FIG. 4, since a printer driver is not installed in the print controlling terminal 10, the print controlling terminal 10 may automatically display the window in the form of a pop-up as illustrated in FIG. 4.

Figure 5:
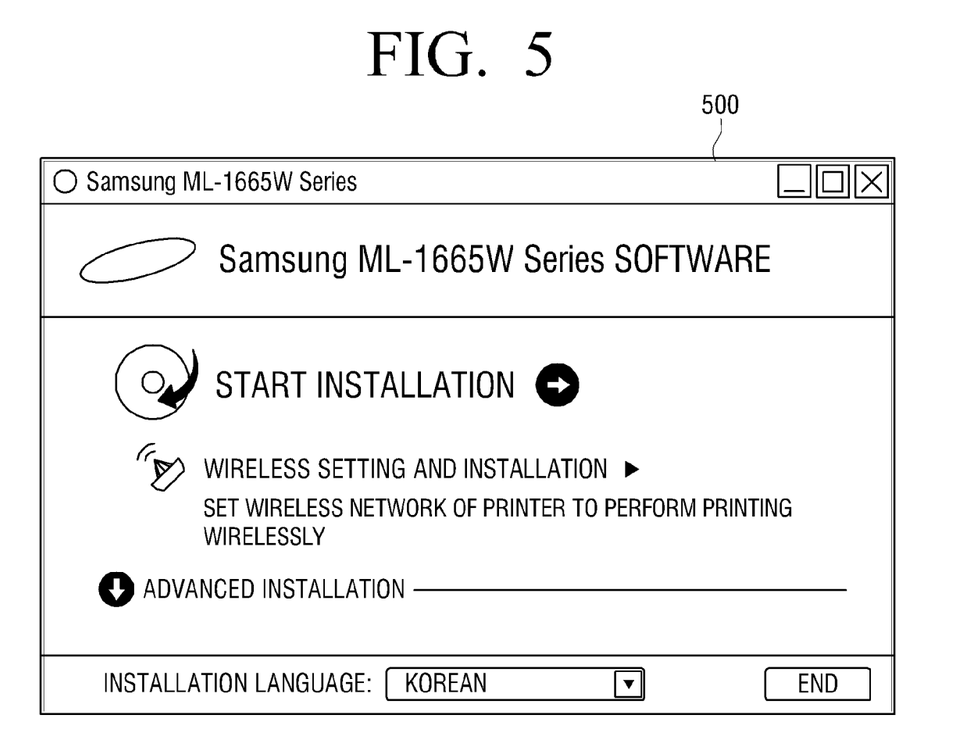

In the exemplary embodiment, if a printer driver is not installed in the print controlling terminal 10, the print controlling terminal 10 additionally recognizes the image forming apparatus 100 as an external storage medium and thus, the print controlling terminal 10 auto-runs the newly connected external storage medium and displays a user interface window as illustrated in FIG. 5. In this case, the user interface window in FIG. 4 may be automatically removed.

Figure 6:
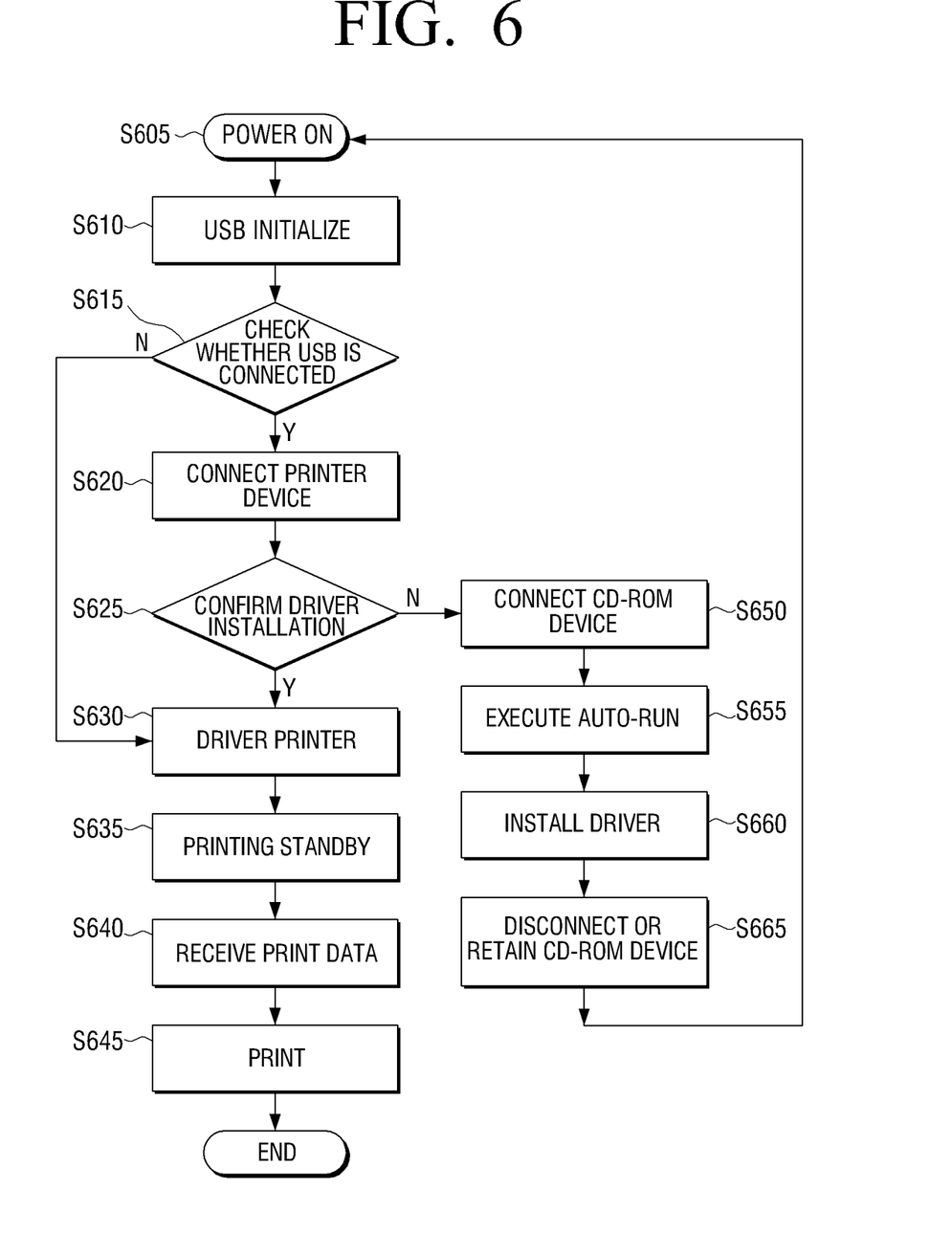
FIG. 6 is a flowchart to explain a method of forming an image according to an exemplary embodiment.

FIG. 6 is a flowchart to explain a method of forming an image according to an exemplary embodiment.

Referring to FIG. 6, if power is supplied to an image forming apparatus (operation S605), a USB port is initialized (operation S610). It is determined whether the image forming apparatus is connected to a print controlling terminal through the USB port (operation S615) detailed operation of determining the connection through the USB port will be explained later with reference to FIG. 7.

When it is determined that the print controlling terminal is connected to the image forming apparatus (operation S615-Y), the print controlling terminal may recognize the image forming apparatus as a printer so as to connect the image forming apparatus as a printer (operation S620).

If the image forming apparatus is connected to the print controlling terminal as a printer, it is determined whether a printer driver is installed in the print controlling terminal (operation S625). Specifically, whether a printer driver is installed in the print controlling terminal may be determined based on whether data for requesting the status of the image forming apparatus is received from the print controlling terminal. For example, a printer driver is determined to be installed in the print controlling terminal 10 if a vender request for requesting the status of the image forming apparatus is received within 10 seconds after the print controlling terminal 10 is connected, and a printer driver is determined not to be installed in the print controlling terminal if the vender request is not received after 10 seconds elapse.

If it is determined that the printer driver is installed in the print controlling terminal (operation S625-Y), the image forming apparatus operates as a printer (operation S630) and waits for print data to be received (operation S635). If print data is received from the print controlling terminal 10 (operation S640), the received print data may be printed (operation S645).

On the other hand, if it is determined that the printer driver is not installed in the print controlling terminal (operation S625-N), the print controlling terminal may additionally recognize the image forming apparatus as an external storage medium and connect the print controlling terminal to the external storage medium (operation S650).

In this case, the image forming apparatus is connected to an external storage medium such as a CD-ROM which stores a printer driver and thus, the print controlling terminal may install the printer driver by auto-running a printer driver installation program stored in the CD-ROM (operations S655 and S660).

During the above process, once the printer driver is installed in the print controlling terminal, the external storage medium may be disconnected (operation S665). Specifically, if a vender request for requesting the status of the image forming apparatus is received from the print controlling terminal, the print controlling terminal may determine that a printer driver is installed in the print controlling terminal and can disconnect an external storage medium therefrom.

According to the present method of forming an image, the image forming apparatus 100 is immediately recognized as a printer when it is connected to the print controlling terminal 10 and thus, a printer initialization time may be reduced. In addition, if a printer driver is determined not to be installed in the print controlling terminal 10, the image forming apparatus 100 may control the print controlling terminal 10 to additionally recognize a CD-ROM including a printer driver so that the printer driver may be installed in the print controlling terminal. Therefore, user convenience and efficiency is enhanced.

The image forming method illustrated in FIG. 6 may be executed in an image forming apparatus having the configuration illustrated in FIG. 1, but may be executed in an image forming apparatus having other configurations as well.

Figure 7:
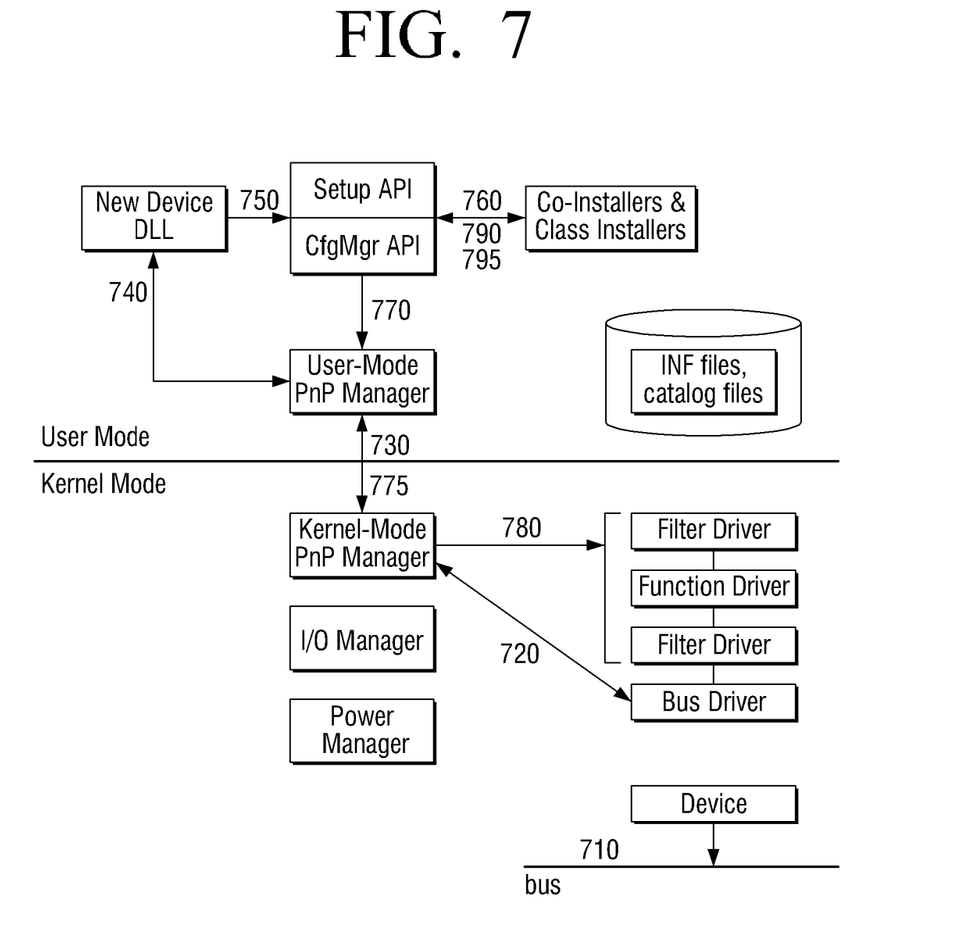
FIG. 7 is a view illustrating the process of connecting a PnP apparatus.

FIG. 7 is a view illustrating the process of connecting a PnP apparatus.

Referring to FIG. 7, if a user adds a new apparatus to a USB port of a system (operation 710), the newly added apparatus is recognized by a corresponding bus (operation 720). In this case, a hot-plug notification notifying that the new apparatus is added is transmitted to a bus driver. In this case, the bus driver informs a PnP manager that the new apparatus is added by calling out IoInvalidateDeviceRelations API, and the PnP manager obtains a new PDO list by requesting IRP_MJ_PNP/IRP_MN_QERY_DEVICE_RELATIONS IRP from a corresponding bus.

Subsequently, a 'Kernel mode PnP manager' informs a 'User mode PnP manager' that the new apparatus is added, and the 'User mode PnP manager' proceeds with installing the new apparatus (operation 730).

The 'User mode PnP manager' generates a new process (newdev.dll) using 'rundll32.exe' to install the new apparatus (operation 740).

A driver list installable in the corresponding apparatus is generated by calling out 'SetupAPI' and 'CfgMgrAPI' in the generated process. If there is an available driver for the corresponding apparatus, the driver is used, and if not, 'unknown' may be displayed on a device manager (operation 750).

Class installer and co-installers may participate in the installation process to process a DIF request (operation 760). Specifically, which device setup class will be used may be determined using a class and a classGUID provided by a version section of an INF file of the corresponding apparatus.

Subsequently, a control may be transmitted to the 'kernel mode PnP manager' again to load a driver and initiate the corresponding apparatus (operations 770 and 775).

The 'Kenrel mode PnP manager' loads a corresponding function driver and other necessary filter drivers and calls out an AddDevice routine for each driver (operation 780). In this case, the corresponding apparatus may be initiated as IRP_MN_START_DEVICE is transmitted to a device driver, if necessary.

Subsequently, an installation completion page may be displayed by sending a DiF_NEWDEVICEWIZARD_FINISH-INSTALL request (operation 790), and if all operations are completed, DIF_FINISHINSTALL_ACTION may be transmitted (operation 795).

Although a few embodiments of the present general inventive concept have been shown and described, it would be appreciated by those skilled in the art that changes may be made in this embodiment without departing from the principles and spirit of the general inventive concept, the scope of which is defined in the claims and their equivalents.

What is claimed is:

1. An image forming apparatus connectable to a print controlling terminal, comprising:
   a communication interface unit which allows the print controlling terminal to recognize the image forming apparatus as a printer if the image forming apparatus is connected to the print controlling terminal;
   a determination unit which determines whether a printer driver of the image forming apparatus is installed in the print controlling terminal;
   a controlling unit which, if a printer driver is installed in the print controlling terminal, controls the communication interface unit to receive print data generated by the printer driver; and
   an image forming unit which prints the received print data,
   wherein the communication interface unit, if a printer driver is not installed in the print controlling terminal, controls the print controlling terminal to additionally recognize the image forming apparatus as an external storage medium and provides the print controlling terminal with a printer driver installation program stored in the image forming apparatus recognized as an external storage medium.

2. The image forming apparatus as claimed in claim 1, wherein the image forming apparatus is connected to the print controlling terminal through a universal serial bus (USB).

3. The image forming apparatus as claimed in claim 1, wherein the determination unit determines whether a printer driver is installed in the print controlling terminal based on whether data for requesting a status of the image forming apparatus is received from the print controlling terminal.

4. The image forming apparatus as claimed in claim 3, wherein the data for requesting a status of the image forming apparatus is a vender request.

5. The image forming apparatus as claimed in claim 1, wherein the printer driver installation program is a program to install a printer driver of the image forming apparatus in the print controlling terminal through an auto-run function.

6. The image forming apparatus as claimed in claim 1, wherein the external storage medium is a CD-ROM device.

7. The image forming apparatus as claimed in claim 1, wherein the communication interface unit controls the print controlling terminal to no longer recognize the image forming apparatus as an external storage medium after execution of the printer driver installation program in the print controlling terminal.

8. The image forming apparatus as claimed in claim 7, wherein the communication interface unit controls the print controlling terminal to no longer recognize the image forming apparatus as an external storage medium if data for requesting a status of the image forming apparatus is received from the print controlling terminal.

9. A method of forming an image in an image forming apparatus connectable to a print controlling terminal, the method comprising:
   if the image forming apparatus is connected to the print controlling terminal, recognizing the image forming apparatus as a printer by the print controlling terminal;
   determining whether a printer driver of the image forming apparatus is installed in the print controlling terminal;
   if a printer driver is determined to not be installed in the print controlling terminal, additionally recognizing the image forming apparatus as an external storage medium by the print controlling terminal and providing the print controlling terminal with a printer driver stored in the image forming apparatus recognized as an external storage medium;
   if a printer driver is installed in the print controlling terminal, receiving print data generated by the printer driver; and
   printing the received print data.

10. The method as claimed in claim 9, wherein the image forming apparatus is connected to the print controlling terminal through a universal serial bus (USB).

11. The method as claimed in claim 9, wherein the determining comprises determining whether a printer driver is installed in the print controlling terminal based on whether data for requesting a status of the image forming apparatus is received from the print controlling terminal.

12. The method as claimed in claim 11, wherein the data for requesting a status of the image forming apparatus is a vender request.

13. The method as claimed in claim 9, wherein the printer driver installation program is a program to install a printer driver of the image forming apparatus in the print controlling terminal through an auto-run function.

14. The method as claimed in claim 9, wherein the external storage medium is a CD-ROM device.

15. The method as claimed in claim 9, further comprising:
   controlling the print controlling terminal no longer recognize the image forming apparatus as an external storage medium when it is determined that a printer driver is installed in the print controlling terminal from the image forming apparatus.

16. The method as claimed in claim 15, further comprising controlling the print controlling terminal to no longer recognize the image forming apparatus as an external storage medium if data for requesting a status of the image forming apparatus is received from the print controlling terminal.

17. An image forming apparatus connectable to a print controlling terminal, comprising:
- a communication interface unit to control the print controlling terminal to recognize the image forming apparatus as at least a printer or an external storage medium; and
- a control unit to perform an initial printing stand-by function when the image forming apparatus is connected to a print controlling terminal having a printer driver corresponding to the image forming apparatus installed therein, and to control the communication interface unit such that a print controlling terminal without the printer driver recognizes the image forming apparatus as the external storage medium having a printer driver installation program.

18. The image forming apparatus of claim 17, wherein the printer driver installation program is configured to auto-run.

19. The image forming apparatus of claim 17, wherein the control unit controls the communication interface unit such that the print control terminal recognizes the image forming apparatus as a printer after the executing the printer driver installation program.

* * * * *